United States Patent [19]

Tono et al.

[11] Patent Number: 5,217,647
[45] Date of Patent: Jun. 8, 1993

[54] METHOD FOR PREPARING RARE EARTH OXYSULFIDE PHOSPHOR

[75] Inventors: Hideo Tono; Youji Tukihashi; Kazuhito Iwasaki, all of Kanagawa, Japan

[73] Assignee: Kasei Optonix, Ltd., Tokyo, Japan

[21] Appl. No.: 773,881

[22] PCT Filed: Mar. 1, 1991

[86] PCT No.: PCT/JP91/00276

§ 371 Date: Oct. 31, 1991

§ 102(e) Date: Oct. 31, 1991

[87] PCT Pub. No.: WO91/13124

PCT Pub. Date: Sep. 5, 1991

[30] Foreign Application Priority Data

Mar. 1, 1990 [JP] Japan .................................. 2-47230

[51] Int. Cl.$^5$ .............................................. C09K 11/84
[52] U.S. Cl. ................................................ 252/301.4 S
[58] Field of Search .................................. 252/301.4 S

[56] References Cited

U.S. PATENT DOCUMENTS 3,647,707  3/1972  Gillooly et al. .............. 252/301.4 S

FOREIGN PATENT DOCUMENTS 1243326  8/1971  United Kingdom ......... 252/301.4 S

*Primary Examiner*—Jack Cooper
*Attorney, Agent, or Firm*—Oblon, Spivak, McClelland, Maier & Neustadt

[57] ABSTRACT

The present invention relates to a method for preparing a rare earth oxysulfide phosphor which comprises baking a mixture containing a rare earth oxide and/or a rare earth compound which becomes a rare earth oxide easily at a high temperature a sulfiding agent and a flux, wherein a rare earth oxysulfide seed is added to the mixture before baking.

5 Claims, 2 Drawing Sheets

METHOD FOR PREPARING RARE EARTH OXYSULFIDE PHOSPHOR

TECHNICAL FIELD

The present invention relates to a method for preparing a rare earth oxysulfide phosphor.

BACKGROUND ART

Since the rare earth oxysulfide phosphor (in the form of $Ln_2O_2S:Ln'$) has good emission efficiency, chemically stable, ease in handling, etc., $Y_2O_2S:Eu$ is practically used as a red-emitting phosphor for color televisions and $Gd_2O_2S:Tb$ is practically used as a green-emitting phosphor for projection cathode-ray tubes.

As a method for preparing this kind of phosphor, it has been known to employ a method wherein $Ln_2O_3$ and $Ln'_2O_3$ as rare earth oxide raw materials are dissolved in a mineral acid and then reacted with oxalic acid to coprecipitate as their oxalates, which are pyrolysed to form a $Ln_2O_3$. $Ln'_2O_3$ mixed crystal, and then a sulfiding agent and a flux are added to the mixed crystal, followed by baking, and a method wherein a sulfiding agent and a flux are added directly to $Ln_2O_3$ and $Ln'_2O_3$, followed by baking (U.S. Pat. No. 3,502,590). In these methods, the flux serves to let the above synthesis proceed easily and accelerate the growth of particles. Under these circumstances, in order to improve the formation efficiency of phosphors and accelerate the growth of particles, attempts have been made to add various kinds of phosphates as the flux, for example, $YPO_4$ (Japanese Patent Publication No. 35555/1976), $Na_4P_2O_7$ (Japanese Patent Publication No. 46182/1979), $AlPO_4$ (Japanese Patent Publication No. 192484/1982), etc. On the other hand, with the trend to high quality color televisions and display tubes in recent years, improved quality fluorescent screens of cathode-ray tubes have been in great demand. To obtain a fluorescent film (dot, stripe) with an excellent packing property it is important that the dispersibility of the phosphor is good and that giant particles are not present. This is because that the presence of the giant particles is apt to cause defects such as pinholes. For fluorescent film properties, it is important to form three pure colors (dots or stripes) by coating. If a red-emitting phosphor particle is deposited on a blue or green picture element formed in the previous step and remains thereon, so-called color cross contamination which reduces color purity is caused. The color cross contamination is mainly caused by fine particles and thus it is desired to reduce the content of the fine particles. Namely, as the powder properties of phosphors, it is desired that the dispersibility is good, the contents of the large particles and fine particles are low and the particle size distribution is narrow.

It is also desired to obtain large particles (i.e. 7 μm or more) which are not readily obtained by conventional synthetic methods, and thus it is required to provide a phosphor having a particle size the particular use of the phosphor.

However, conventional techniques for synthesizing phosphors are not adequate because there is a limit in the particle size control, i.e. by adjusting the baking temperature or the kind or the amount of the flux added. Particularly, the synthesis of large particle phosphors is difficult and, if the baking temperature is high, the synthetic conditions in a baking container become uneven which lead to the production of phosphors containing considerable amounts of the giant particles and fine particles and having a wide particle size distribution.

DISCLOSURE OF INVENTION

The present invention is to overcome the above drawbacks and to provide a method for preparing a rare earth oxysulfide phosphor which has good dispersibility, a narrow particle size distribution and a desired particle size.

The present invention provides a method for preparing a rare earth oxysulfide phosphor represented by, for example, the formula $Ln_2O_2S:Ln'$, by adding a sulfiding agent and a flux to rare earth oxides such as $Ln_2O_3$ and $Ln'_2O_3$, etc. wherein Ln is an element such as Gd, Y, Sc, Lu or La and Ln' is an element such as Eu, Tb, Sm, Pr, Dy or Tm, followed by baking, characterized in that seeds (seed crystals) of a rare earth oxysulfide ($Ln_2O_2S:Ln'$ and/or $Ln_2O_2S$) are added to the above mixture before baking.

It is preferred that 1 to 60% by weight, particularly 5 to 30% by weight, of the rare earth oxysulfide seeds be added to the total amount of the rare earth oxide and the rare earth oxysulfide seeds from the viewpoint of the particle size distribution, the particle size or the like of the rare earth oxysulfide phosphor. Also, it is recommended that 1 to 40% by weight, more preferably 3 to 30% by weight, of the above seeds be added taking into account such factors as the production cost and the production efficiency.

In the conventional synthetic methods, the formation of nuclei for the growth of particles, coupled with the unevenness of the synthetic conditions in the baking container, causes a deviation in the formation and also a great difference in the growth of particles. It is considered that a phosphor having a wide particle size distribution is thereby produced.

According to the present invention wherein, in the course of mixing a sulfiding agent and a flux with a rare earth oxide and/or a rare earth compound which easily becomes its oxide at a high temperature (e.g. carbonates, oxalates, sulfites or the like of rare earth elements) followed by heating and synthesizing, adding an appropriate amount of rare earth oxysulfide seeds (seed crystals) having an appropriate particle size, it is possible to achieve uniform particle growth, obtain particles having a good dispersibility with less fusing of particles, achieve a narrow particle size distribution containing fewer fine particles and giant particles, and produce a rare earth oxysulfide phosphor having a desired particle size.

The particle size of the rare earth oxysulfide seeds added in the present invention is less than the particle size of the objective rare earth oxysulfide phosphor. With respect to the particle size of the above seeds, a particle size which is 80% or less of the median particle size ($d_{50}$) of the phosphor is usually used. Particularly, it is preferred that the seeds used contain a majority of particles having a particle size within the range of 10 to 70% of the median particle size. Particularly, for the efficiency of the growth of particles, it is optimum that the majority of the particle sizes of the phosphor is within the range of 25% to 65%. For the improvement thereupon, it is recommended to use seeds, wherein the majority of which have a particle size within the range of 10% to 40%. In the present invention, it is recommended to use a phosphor represented by $Ln_2O_2S:Ln'$ among the rare earth oxysulfide seeds because of its merit in use.

The method of the present invention provides a meaningful effect only to the rare earth oxysulfide phosphor. No such effect is observed on the conventional sulfide series phosphors (e.g. phosphors such as ZnS:Ag, ZnS:CuAl or ZnCdS:Cu), oxide phosphors (e.g. phosphors such as $Ln_2O_3$:Eu), etc.

In the present invention, the median particle size ($d_{50}$) is represented by the weight distribution.

According to the present invention, wherein the above construction is employed, it is possible to obtain a rare earth oxysulfide phosphor which is good in dispersibility, easily controlled particle size within a narrow particle size distribution and is excellent in coating properties.

BEST MODE FOR CARRYING OUT THE INVENTION Example 1

226 g of $Y_2O_3$ and 13.7 g of $Eu_2O_3$ were dissolved in nitric acid and diluted with pure water to about 1.8 l, followed by heating at 70° C. Then, a 70° C. solution of 565 g of oxalic acid dissolved in 1 l of pure water was added while stirring to the previously prepared solution to conduct coprecipitation and form oxalates of Y and Eu. After washing with water several times, it was heated at 900° C. for 1 hour to form an oxide. To 160 g of $(Y,Eu)_2O_3$, 70 g of sulfur, 70 g of sodium carbonate and 20 g of potassium phosphate, a $(Y,Eu)_2O_2S$ seed having the same molar ratio of Y and Eu as the molar ratio of the rare earth oxide and having the particle size $d_{50}$ of 4.5 μm was added which changing the added amount successively, for example, 10 g when the mixing ratio was 5% and 20 g when the mixing ratio was 10%. The mixture was thoroughly mixed, then put into an alumina crucible, and baked at 1,150° C. for 2 hours. The baked product was repeatedly washed with water, and the residual alkali was neutralized with nitric acid. The resulting product was subjected to dispersing treatment by a ball mill, dehydrated, filtered, and then dried and at 120° C. for 13 hours, followed by sieving with a nylon mesh of 250 mesh to obtain $Y_2O_2S$:Eu red-emitting phosphors corresponding to the respective mixing ratios.

Figure 2:
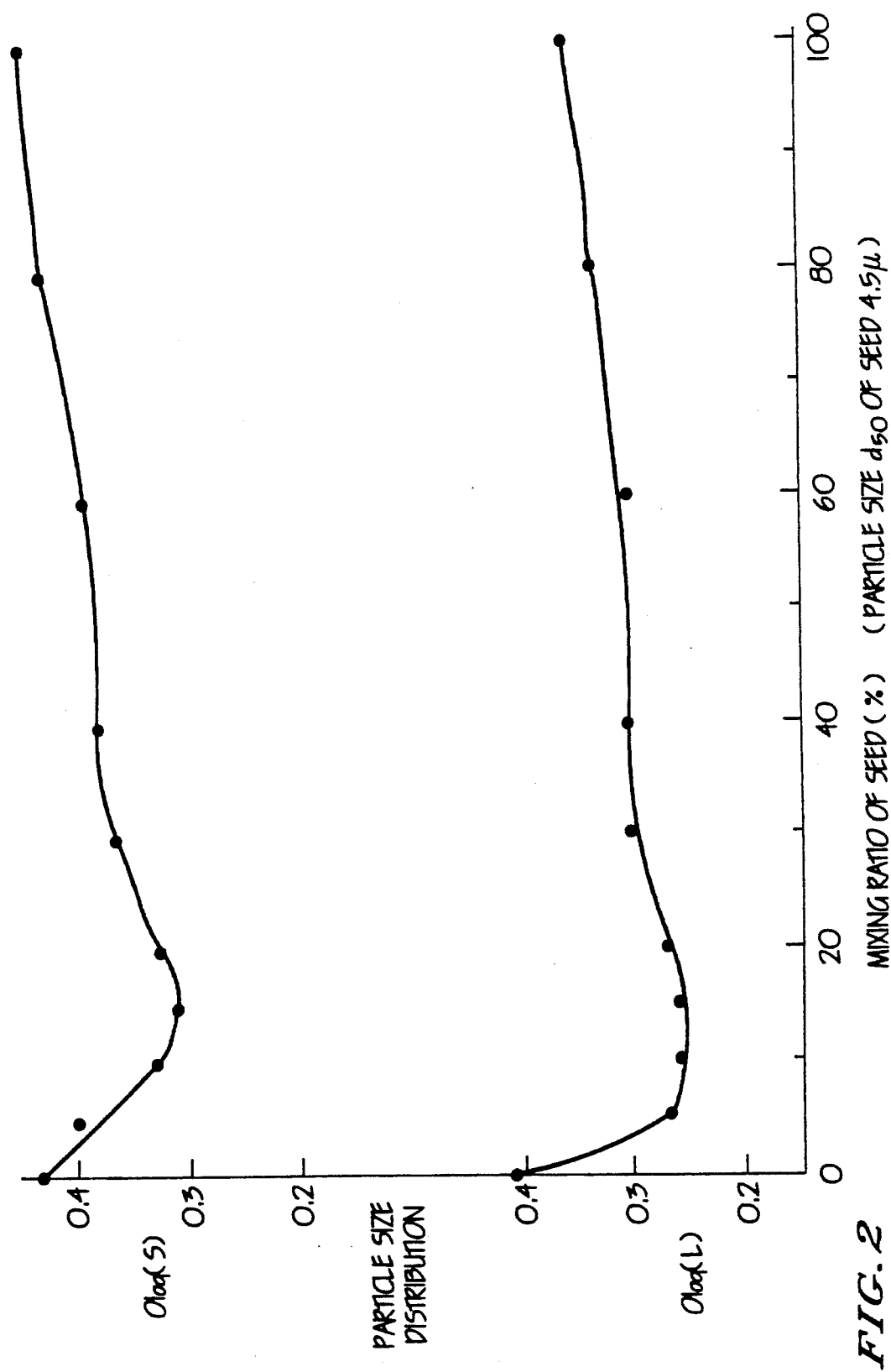

With respect to the phosphors obtained under the above synthetic conditions provided that the mixing ratio of the seeds was changed from 5% to 80%, their effects to the particle size distribution were examined. The particle size distribution in FIG. 2 is a particle size distribution when the mixing ratio of the seeds was changed while taking $\sigma\log(L)=\log(d_{84.1}/d_{50})$ and $\sigma\log(S) = -\log(d_{15.8}/d_{50})$ as ordinates. $\sigma\log(L)$ shows the extent of incorporation of giant particles. The larger the value, the higher the content. $\sigma\log(S)$ shows the extent of incorporation of fine particles. The larger the particle, the higher the content.

Figure 1:
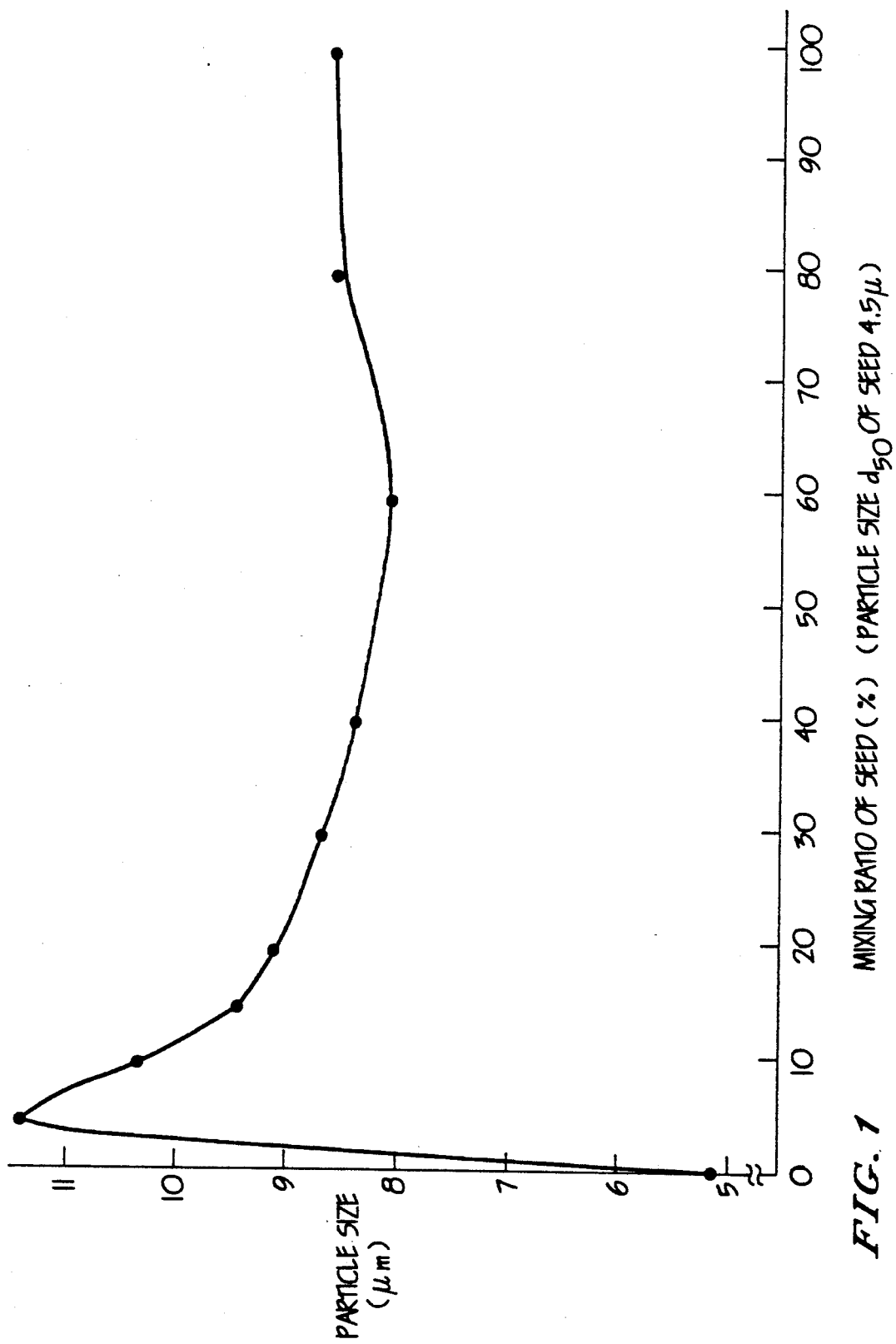
FIGS. 1 and 2 are graphs showing the particle size $d_{50}$ and the particle size distribution of the phosphor obtained by changing the mixing ratio of the seeds in Example 1.

It is evident from FIG. 1, when seeds having the particle size of 4.5 μm is added, the particle size is changed with the mixing ratio of the seeds. Particularly, the median particle size $d_{50}$ of the phosphor obtained at the mixing ratio of 5% by weight indicates the highest value of 11.4 μm, and, when the mixing ratio is further increased, the value is gradually decreased and indicates the lowest value of 8 μm at the mixing ratio of 60% by weight.

It is also evident from FIG. 2 that the value of $\sigma\log(L)$ becomes small by the addition of the seeds and the content of giant particles is reduced. Particularly, the tendency is remarkable within the range of 5 to 30% by weight. $\sigma\log(S)$ also has the essentially same tendency as $\sigma\log(L)$.

In this Example, when a part of Y was replaced with 10 mol % of Gd, the effect was essentially same, and, when 1,000 ppm of Sm was added, no change was observed.

Example 2

226 g of $Y_2O_3$ and 13.7 g of $Eu_2O_3$ were dissolved in nitric acid, diluted with pure water to about 1.8 l, and then heated at 70° C. When a 70° C. solution of 565 g of oxalic acid dissolved in 1 l of pure water was added to the previously prepared solution to coprecipitate oxalates of Y and Eu. After washing with water several times, heating was conducted at 900° C. for 1 hour to form an oxide. To 160 g of $(Y,Eu)_2O_3$ thus obtained, 70 g of sulfur, 70 g of sodium carbonate and 20 g of potassium phosphate, 40 g of a $(Y,Eu)_2O_2S$ seeds having the particle size $d_{50}$ of 4.5 μm, which has the same molar ratio of Y and Eu as the molar ratio of the rare earth oxide, was added. The mixture was thoroughly mixed, then put into an alumina crucible, and baked at 1,150° C. for 2 hours. The baked product was repeatedly washed with water, and its residual alkali was neutralized with nitric acid. The resulting product was subjected to dispersing treatment by a ball mill, dehydrated and filtered, and then dried at 120° C for 13 hours, followed by sieving with a nylon mesh of 250 mesh to obtain a $Y_2O_2S$:Eu red-emitting phosphor.

For the purpose of comparison, in Comparative Example 1, a phosphor was prepared under the above-mentioned conditions provided that the seed was not used, and, in Comparative Example 2, large particles were prepared by using no seed and changing the baking temperature to 1,250° C. to conduct the baking at a higher temperature.

The powder properties and coating properties of the phosphors thus obtained are shown in Table 1. In this Table, the sediment volume in water is obtained in such a manner that 5 g of a phosphor and 30 ml of pure water were placed in a 30 ml settling tube, well shaken, left to stand and measured its sediment volume after 1 hour. The packing property of the coating properties indicates the extent of packing of the phosphor particles which constitute the fluorescent film (dot, stripe), wherein ◯ indicates to have excellent packing property and X indicates not having necessary packing property. The color mixing indicates the extent of the red-emitting phosphor particles attached on blue picture elements (dot, stripe), thereby indicating the effect to the color purity of blue color. ◯ indicates that no essential effect to the color purity is observed and X indicates that the effect is large. It is found that, although the phosphor in Example 2 is grown as considerably large as 8 μm in the particle size $d_{50}$, $\sigma\log(S)$ and $\sigma\log(L)$ are small, whereby the particle size distribution is narrow. It is also found that the sediment volume in water is small, the dispersibility is good, and the packing property and color cross contamination are excellent.

The phosphor in Comparative Example 2 was obtained by the method wherein no seed was used under the preparation conditions in Example 2, and its particle size $d_{50}$ is as small as 4.9 μm. On the other hand, in Comparative Example 1 wherein the baking temperature is raised, although the phosphor thus obtained has a particle size $d_{50}$ of 8.0 μm which is close to that of Example 2, other powder properties and coating properties are considerably inferior to those of Example 2, similarly as in the case of Comparative Example 2.

When a part of Y was replaced with 20 mol % of Sc in this Example, the effect was substantially same.

Example 3

160 g of $Gd_2O_3$ and 2.8 g of $Tb_4O_7$ were added with 60 g of sulfur, 60 g of sodium carbonate and 10 g of potassium phosphate, and further added with 40 g of $(Gd,Tb)_2O_2S$ seeds having the particle size $d_{50}$ of 4.5 μm which has the same molar ratio of Gd and Tb as of the molar ratio of the rare earth oxide. The mixture was thoroughly mixed, and put into an alumina crucible, followed by baking at 1,150° C. for 2 hours. The baked product was repeatedly washed with water, and its residual alkali was neutralized with nitric acid. The resulting product was subjected to dispersing treatment by a ball mill, dehydrated and filtered, and then dried at 120° C. for 13 hours, followed by sieving with a nylon mesh of 250 mesh to obtain a $Gd_2O_2S$:Tb green-emitting phosphor.

For the purpose of comparison, in Comparative Example 4, a phosphor was prepared by the method wherein no seed was used under the above-mentioned preparation conditions, and, in Comparative Example 3, the preparation was conducted by using no seed and changing the baking temperature to 1,200° C.

The powder properties and coating properties of the phosphors thus obtained are shown in Table 2. It is found, from the comparison between Comparative Examples 3 and 4, that the phosphor of Comparative Example 3 is superior to that of Comparative Example 4 in the powder properties and coating properties as shown in the Table.

In the above, as typical examples, the case wherein Y, Gd or Sc is used as a host element (Ln) and the case wherein Eu, Tb or Sm is used as an activator element (Ln') are exemplified. However, according to the present invention, the effect of the present invention can be obtained also in the case wherein La or Lu as other host element is used, the case where a solid solution including these elements is used, the case wherein Pr, Dy or Tm is used as other activator element (Ln'), further the case of coactivation by two or more elements including these elements. In addition, by using the technique of the present invention, a phosphor of large particle size which have not been obtained in the conventional manner can be obtained, i.e. a phosphor of 20 μm can be obtained by using seeds of 10 μm, whereby the present invention is extremely useful.

TABLE 1

| | Powder properties | | | Sediment volume in water (ml) | Coating properties | |
|---|---|---|---|---|---|---|
| | Particle size $d_{50}$ μm | σlog (L) | σlog (S) | | Packing property | Color mixing |
| Example 1 | 8.2 | 0.26 | 0.30 | 1.9 | ○ | ○ |
| Comparative Example 1 | 8.0 | 0.44 | 0.47 | 2.6 | X | X |
| Comparative Example 2 | 4.9 | 0.40 | 0.43 | 3.0 | ○ | X |

TABLE 2

| | Powder properties | | | Sediment volume in water (ml) | Coating properties | |
|---|---|---|---|---|---|---|
| | Particle size $d_{50}$ μm | σlog (L) | σlog (S) | | Packing property | Color mixing |
| Example 3 | 8.4 | 0.24 | 0.29 | 1.5 | ○ | ○ |
| Comparative Example 3 | 8.1 | 0.41 | 0.45 | 1.8 | X | X |
| Comparative Example 4 | 5.4 | 0.40 | 0.42 | 2.3 | ○ | X |

We claim:

1. A method for preparing a rare earth oxysulfide phosphor of the formula $Ln_2O_2S$:Ln' which comprises, baking a mixture of $Ln_2O_3$ and $Ln'_2O_3$ and/or a rare earth compound which becomes a rare earth oxide during baking a sulfiding agent, a flux and rare earth oxysulfide seeds, wherein said rare earth oxysulfide seeds are selected from the group consisting of $Ln_2O_2S$:Ln' and $Ln_2O_2S$, the size of said rare earth oxysulfide seeds not exceeding 80% of the median particle size of the resulting rare earth oxysulfide phosphor, and wherein said seeds are present in an amount of from 1 to 60% by weight of the total amount of rare earth oxide and rare earth oxysulfide seeds, wherein Ln is at least one element selected from the group consisting of Gd, Y, Sc, Lu and La and Ln' is at least one element selected from the group consisting of Eu, Tb, Sm, Pr, Dy and Tm, said phosphor exhibiting a narrower particle size distribution than the phosphor prepared as above absent the rare earth oxysulfide seeds.

2. The method of claim 1, wherein said rare earth oxysulfide seeds are present in amount of from 3 to 30% by weight.

3. The method of claim 1, wherein the particle size of the rare earth oxysulfide seeds is within a range of from 10 to 70% of the medium particle size of said rare earth oxysulfide phosphor.

4. The method of claim 1, wherein said rare earth oxysulfide seeds ar of the formula $Ln_2O_2S$:Ln', wherein Ln is at least one element selected from the group consisting of yttrium and gadolinium and Ln' is at lest one element selected from the group consisting of europium and terbium.

5. The method of claim 1, wherein the flux and sulfiding agent consist of sodium carbonate, potassium phosphate, and sulfur.

* * * * *